United States Patent
Gühring et al.

(10) Patent No.: US 7,466,850 B2
(45) Date of Patent: Dec. 16, 2008

(54) COMPUTERIZED METHOD AND APPARATUS FOR ITERATIVE CALCULATION OF THE GENERAL LINEAR MODEL USING ONLY SUBSTANTIALLY ORTHOGONAL MODEL FUNCTIONS

(75) Inventors: Jens Gühring, Langensendelbach (DE); Stefan Thesen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 417 days.

(21) Appl. No.: 11/372,499

(22) Filed: Mar. 10, 2006

(65) Prior Publication Data

US 2006/0265199 A1 Nov. 23, 2006

(30) Foreign Application Priority Data

Mar. 10, 2005 (DE) .................. 10 2005 011 125

(51) Int. Cl.
 *G06K 9/00* (2006.01)
 *A61B 5/05* (2006.01)
(52) U.S. Cl. .................. 382/131; 382/228; 600/410
(58) Field of Classification Search .................. None
 See application file for complete search history.

(56) References Cited

U.S. PATENT DOCUMENTS

2004/0162478 A1 8/2004 Thesen

FOREIGN PATENT DOCUMENTS

WO WO 03/016824 2/2003

OTHER PUBLICATIONS

"Estimation of General Linear Model Coefficients for Real-Time Application," by Bagarinao et al, NeuroImage (2003), pp. 422-429.

*Primary Examiner*—Charles Kim
(74) *Attorney, Agent, or Firm*—Schiff Hardin LLP

(57) ABSTRACT

In a method and apparatus for incremental calculation of a general linear model given intermittent correlation of the model functions, data composed of a number of data sets with a number of different random samples are processed. For each independent random sample contained in the data set, a dependency on an order quantity is compared with the dependency on the order quantity in model functions contained in a model matrix G using the general linear model in order to check the occurrence of specific characteristics in the dependency of the random sample on the order quantity. The calculation of the general linear model ensues incrementally from data set to data set. Before the calculations for the data of a data set, a check is made as to whether the model functions contained in the model matrix G exhibit orthogonal portions to a sufficient degree in a segment (represented by the data set) of the dependency on the order quantity for the calculations. Given a degree of parallelism that is too high, one or more model functions of the model matrix G that interfere with the orthogonality are masked out to a predeterminable degree in the calculations for this data set, in order to achieve the sufficient degree of orthogonal portions. An incremental calculation of the general linear model with corresponding output of intermediate results is thereby enabled, even given the presence of intermittent correlating model functions in the model matrix.

12 Claims, 3 Drawing Sheets

FIG 2
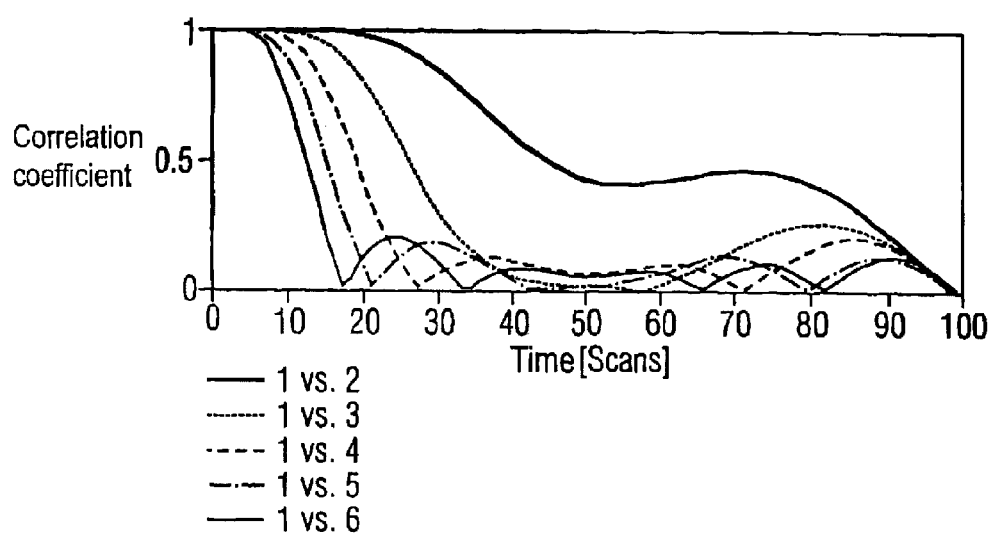
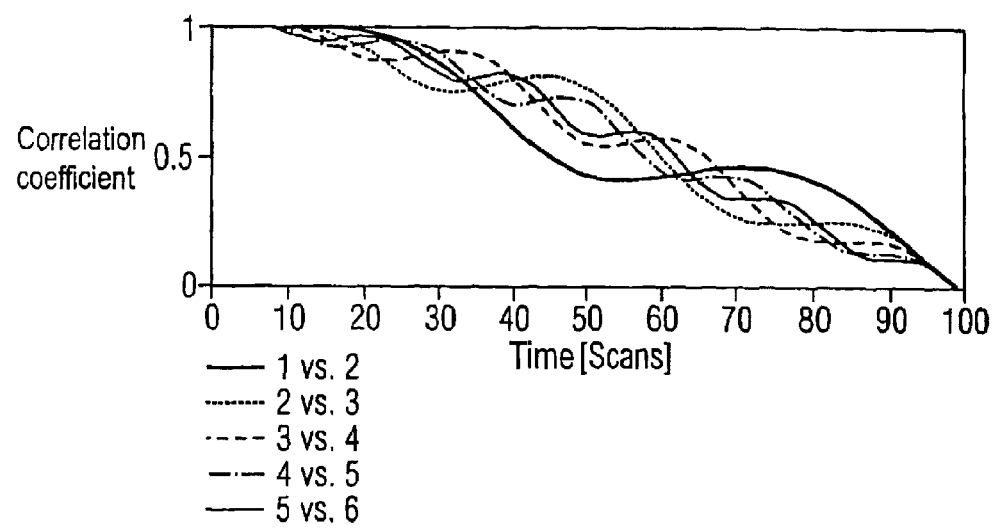

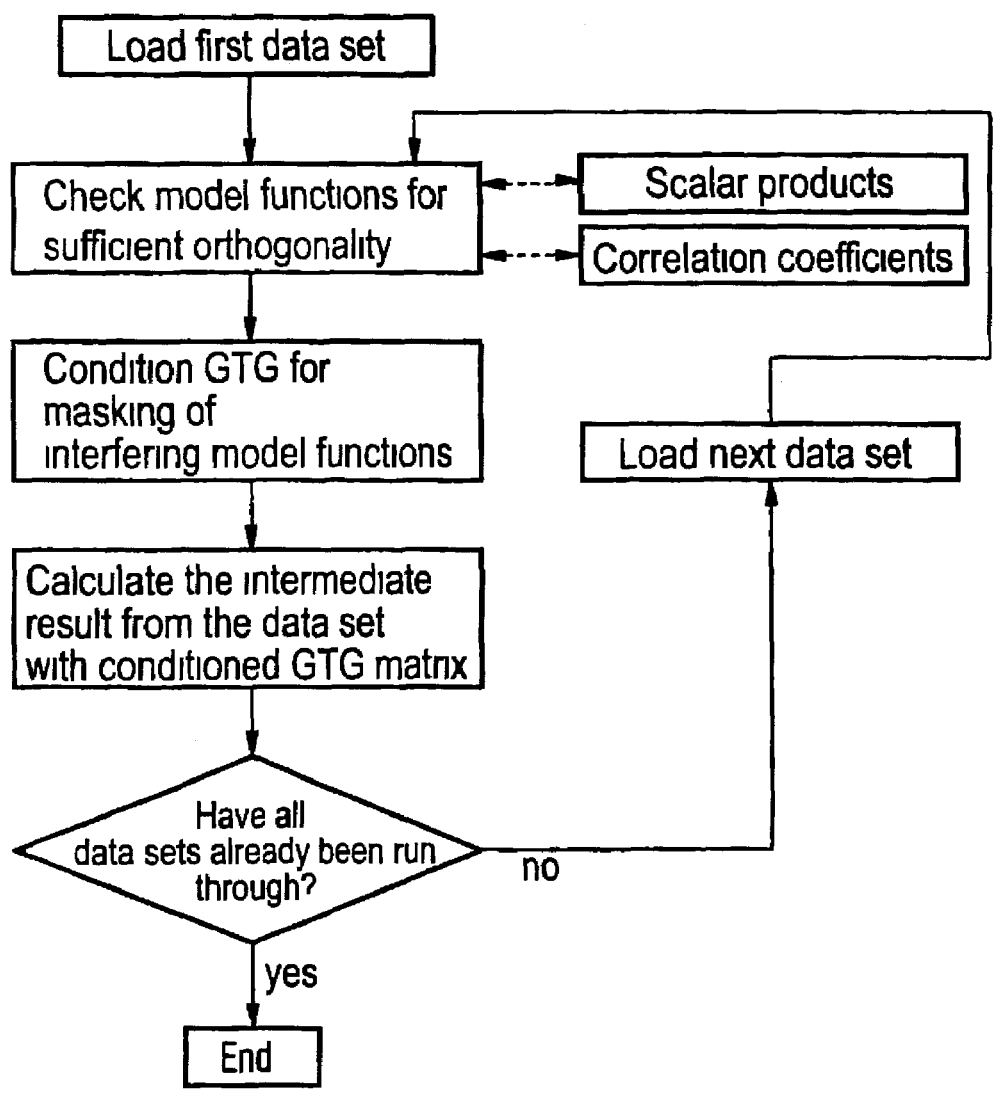

COMPUTERIZED METHOD AND APPARATUS FOR ITERATIVE CALCULATION OF THE GENERAL LINEAR MODEL USING ONLY SUBSTANTIALLY ORTHOGONAL MODEL FUNCTIONS

BACKGROUND OF THE INVENTION

1. Field of the Invention

The present invention present concerns a computerized method and apparatus for processing data using the general linear model, wherein the data are composed of a number of data sets with a plurality of different random samples.

2. Description of the Prior Art

Data processing methods are known wherein, for each independent random sample contained in the data set, its dependency on an order quantity is compared with the dependency on the order quantity in model functions contained in a model matrix G. The comparison is made using the general linear model in order to check the occurrence of specific characteristics in the dependency of the random sample on the order quantity. Calculations from the data (which calculations are necessary for the comparison) are implemented in a predetermined sequence of the data sets for all relevant data of a data set and are stored as intermediate results. The intermediate results of an immediately preceding data set are updated with the new calculations; such that at any time an intermediate result and a final result according to at least one pass through all data sets exists, from which a conclusion can be derived about the occurrence of the characteristics in the dependency of the random sample on the order quantity.

There exists a need to acquire information about brain activity in human and animal organs, in particular in the field of medical technology and medical research. Neuronal activation is expressed as an increase of the blood flow in activated brain areas, leading to a decrease of the blood deoxyhemoglobin concentration. Deoxyhemoglobin is a paramagnetic substance that reduces the magnetic field homogeneity and thus can be shown with magnetic resonance techniques, since it accelerates the $T_2^*$ signal relaxation.

A localization of brain activity is enabled by the use of a functional imaging method that measures the change of the NMR signal relaxation with a time delay. The biological effective mechanism is known in the literature as the BOLD (Blood Oxygen Level Dependent) effect. Fast magnetic resonance imaging enables the BOLD effect to be examined in vivo dependent on activation states of the brain. In functional magnetic resonance tomography, magnetic resonance data acquisitions of the subject volume to be examined (for example the brain of a patient) are made at short temporal intervals. A stimulus-specific neuronal activation can be detected and spatially localized by comparison of the signal curve measured by functional imaging for each volume element of the subject volume with the time curve of a model function. The stimulus can be, for example, a somatosensory, acoustic, visual or olfactory stimulus as well as a mental or motor task. The model function or the model time series describes the expected signal change of the magnetic resonance signal as a result of neuronal activation. Slight temporal intervals between the individual measurements can be realized by the use of fast magnetic resonance techniques such as, for example, the echo planar method.

In many multivariate statistical analyses, a model known as the general linear model (GLM) is used for the comparison of the measured signal curve with the time curve of a model function. The general linear model is a least squares fit of measurement data to one or more model functions. With the aid of the general linear model it is determined which linear combination of the model functions optimally approximates the measurement data series to the greatest extent possible.

Furthermore, for each model function a calculation can be made as to how significantly the measurement data of the null hypothesis of no contribution contradict the respective model function regarding the measurement data series. The general linear model is used for analysis of measurement data in many fields such as, for example, physics or sociology. It is also suitable for analysis of time series measured in functional magnetic resonance imaging (fMRI). By use of the general linear model, it can be analyzed whether the measured time series show a pattern that corresponds to the local neuronal activity. In addition to this pattern, however, the time series frequently also show other characteristics such as, for example, drifts or other effects that can likewise be modeled in the framework of the general linear model. This allows a better analysis of the measurement data than for example, t-test or correlation methods. For example, with the general linear model it is also possible to analyze a number of effects in the brain in parallel. Group statistics over a number of test subjects are also possible. Further application possibilities of the general linear model are found, for example, "Human Brain Function" by R. Frackowiak et al., Academic Press.

In the processing of measurement data that are acquired from a subject volume with the method of functional magnetic resonance tomography conventionally, it has been initially necessary to load the entire measurement data (which are composed of a number of volume data sets created by temporally successive measurements) into the main memory of the computer. The signal curve or the time series would then have to be subsequently extracted for each volume element of the measured subject volume and compared with the respective model function. In the known implementation of the general linear model in the freely available SPM software (Wellcome Department of Cognitive Neurology; University of London; published under Gnu Public License; http://www.fil.ion.ucl.ac.uk/spm/), it is likewise necessary to load the complete data set to be analyzed (which data set can contain several hundreds of megabytes, up to gigabytes of data given long fMRI studies (possibly also for multiple test subjects)) into the main memory of the computer. The values to be analyzed, which belong to a time series of measurement data, are then extracted and the general linear model is directly calculated.

To reduce the main memory requirement as well as the calculation time in the calculation of the general linear model, methods for incremental calculation of the general linear model are proposed in WO 03/016824 A2 and DE 102 54 606 A1. In methods of this type, calculations (required for the comparison) from the measurement data are implemented (in an order resulting from the temporal sequence of the measurements) for all relevant measurement data of a data set and are stored as intermediate results. The intermediate results are respectively updated with the new calculations, such that at any time an intermediate result and an end result according to the at least one pass through all data sets exist from which a conclusion can be derived about the occurrence of the characteristics in the measured curve.

However, it has become apparent that intermittent problems can occur in the calculation of the intermediate results. The time curve of the measurements can be interpreted from a voxel as an n-dimensional vector. From a geometric perspective, m model functions form the basis of an m-dimensional sub-space on which the vector of the measurement data is projected. In order to be able to clearly specify the vector of the projection in the m-dimensional sub-space on the basis of the model functions, the model functions cannot be collinear. For a practical application with numerical stability, the model functions must contain portions sufficiently orthogonal to one another. Model functions that exhibit sufficiently orthogonal portions when considered over the entire time curve of the measurement, when the time segments are considered individually, can be exactly or nearly collinear to these time segments. This prevents an evaluation in the corresponding time segment or the associated data set because the calculations are not defined or does not supply numerically stable results.

E. Bagarino et al., "Estimation of general linear model coefficients for real-time application", NeuroImage 19 (2003) 422-429, describe a method for incremental calculation of the general linear model in which calculations (required for the comparison) from the measurement data likewise result in an order of the data sets that arises from the temporal sequence of the measurements. In this method, the model functions of the general linear model are initially orthogonalized with Gram-Schmidt methods. The ancillary coefficients associated with the orthogonalized functions are then estimated based on the measurement data, and the coefficients of the model functions are finally calculated from the ancillary coefficients. This enables a reliable calculation of intermediate results of the method.

SUMMARY OF THE INVENTION

An object of the present invention is to provide a computerized method for calculation of the general linear model with which a reduction of the main memory requirement as well as of the calculation time is achieved, and in which intermediate results can be calculated and evaluated without limitation given intermittent correlation of the model functions.

The present method can be used, for example, for processing measurement data that are composed of a number of data sets (created with temporally successive measurements) with a number of independent random samples, wherein, for each independent random sample contained in the data set, a measured time curve that results from measurement data x of the random sample is compared with the time curve in model functions contained in a model matrix G using the general linear model in order to check the occurrence of specific characteristics in the measured time curve. In principle the method can also be used for the evaluation of data that differ not due to the point in time of their acquisition, but due to another order quantity (for example length, age, color, etc.).

In the following, the computerized method and its advantages are explained (without being limited to this application field) using the processing of measurement data that are acquired from a subject volume with a functional imaging measurement method (in particular functional magnetic resonance tomography) and are composed of volume data sets created by temporally successive measurements. In this method, for each volume element acquired in the subject volume, a time curve is determined from the measurement data of this volume element and is compared with the time curve of model functions contained in a model matrix G using the general linear model in order to check the occurrence of specific characteristics across samples in the signal curve. Calculations (required for the comparison) from the measurement data are respectively implemented for all relevant measurement data of a volume data set in an order of the data sets or volume data sets that results from the temporal sequence of the measurements. The calculations are stored as intermediate results; with the intermediate results from the respective immediately preceding volume data set being updated with the new calculations; such that at any time intermediate results can be calculated and an end result according to at least one pass through all volume data sets exists that allows a conclusion about the occurrence of the characteristics or pattern in the signal curve. This underlying procedure for the implementation of such a method is known from the aforementioned printed documents WO 03/016824 A2 and DE 102 54 606 A1, the disclosures of which are incorporated herein by reference.

In accordance with the invention, before the calculations for the measurement data of a data set a check is made as to whether the model functions contained in the model matrix G exhibit portions that are sufficiently orthogonal for the calculations in the time segment of the time curve that is represented by the data set, and one or more model functions of the model matrix G exhibiting excessive parallelism that interferes with the orthogonality are masked out to a predeterminable degree in the calculations for this data set, in order to achieve sufficiently orthogonal portions.

In a preferred application, the invention concerns the processing of measurement data that are acquired from a subject volume with a measurement method of functional imaging (in particular functional magnetic resonance tomography) and are composed of a number of volume data sets created by temporally successive measurements, in which processing a temporal signal curve that results from measurement data of the volume element is compared with the time curve of at least one model function for each volume element acquired in the subject volume.

In the inventive computerized method, the approach is automatically always limit the number of the model functions during the implementation of the computerized calculations such that a determinable equation system is always created. This process is dynamically implemented during the entire run time. It is thereby ensured that the optimal set of model functions at the respective time (i.e. the time segment within the considered time curve) is always used. If two or more model functions are overly parallel, multiple model functions must thus be omitted until the problem can be unambiguously solved again. The removal of such interfering model functions is justifiable since a model component that is collinear to the remainder of the model represents no additional information. By a complete deletion of the disruptive model functions, the statistical model (i.e. the design or model matrix G) is, however, completely altered. This would result in a completely new statistical evaluation, such that, given the incremental or iterative calculation considered here, all data points already adopted in the calculation would be lost and a complete recalculation would have to be started upon each change of the model functions used. To avoid this undesirable result, in the present method the respective interfering model functions (that can be different in different time segments of the time curve) are not completely deleted. Instead, these interfering model functions are merely masked out to a predeterminable degree in the calculations for the corresponding data set in order to obtain a sufficient degree of orthogonal portions among the model functions that are not masked out.

A continuous recalculation is avoided by this procedure, and modelings or model functions can be used that previously could be used only for the analysis of the total data after conclusion of all measurements. With the inventive method, with an only slight calculational modification a result identical or extremely similar to the recalculation is achieved. This modification can be adapted for each time segment or data set queued for calculation, such that intermediate results can be calculated and evaluated without limitation.

The masking of the one or more interfering model functions can ensue by setting the contribution of these model functions to a low value in the respective calculations. In an embodiment of the method the pseudo-inverse $(G^T \cdot G)^{-1}$ (generated in the framework of the statistical calculations) is suitably modified or conditioned in order to force the estimation for the contribution of the interfering model functions to a predeterminable value, for example to zero (i.e. no contribution). Using this masking to a predeterminable degree, the overall problem can also be unambiguously solved given the continuation of the interfering model functions in the model matrix G. By variation of this predeterminable measure, interfering model components can additionally be smoothly coupled into or uncoupled from, or masked into or out of, the calculation.

The selection of the interfering model functions can ensue completely automatically, for example by a computerized analysis of the scalar products of the individual model functions with one another. Interfering model functions are the model functions of the model matrix G that, when eliminated, allow the remaining model functions to define a basis for the calculation in a numerically sufficient, stable manner. The angle between the model component can be determined by an analysis of the scalar product. A numerically sufficient, stable basis can be established by a sufficiently large angle.

In a further embodiment, the measure of orthogonal portions between the individual model functions is determined by calculation of a correlation coefficient between two of the model functions. A high correlation between two model functions corresponds to a high degree of parallelism.

The present method thus enables an incremental calculation of the general linear model in which the measurement data are not run through according to temporal series or volume elements, but rather per volume; the present method also enables the calculation and evaluation of intermediate results given intermittently correlating model functions without increased computation outlay. All calculations can already be implemented during the measurement, such that the display of an always-current intermediate result is possible.

The present method can be used, for example, in a computer of a magnetic resonance scanner such that a fast post-processing of fMRI data is possible. By suitable implementation of the method, the representation of the comparison results can ensue in real time as long as the data sets do not contain too many volume elements and the number of the model functions is not selected too high. In particular the calculation in real time is not limited by the number of the volume data sets since the calculation time is constant, independent of the number of the already added data sets.

An apparatus in accordance with the invention has at least one computer processor for implementation of the described above calculations, a mass memory for storage of the total data, and a working memory for acceptance of at least one data set as well as intermediate results of the calculations. The apparatus further has a device or a module for implementation of the method according to any of the variants described above. The apparatus can be, for example, the computer or a component of the computer of a magnetic resonance system.

DESCRIPTION OF THE DRAWINGS

FIG. 2 shows examples for correlation coefficients between the model functions of the design matrix of FIG. 1 as a function of the time.

FIG. 3 is a flowchart of an exemplary embodiment for the implementation of the inventive method.

DESCRIPTION OF THE PREFERRED EMBODIMENTS

In the present exemplary embodiment, the incremental calculation of the general linear model for functional magnetic resonance imaging (fMRI) is initially shown. Given this application, updated intermediate results should always be displayed during the running experiment (data acquisition).

Figure 4:
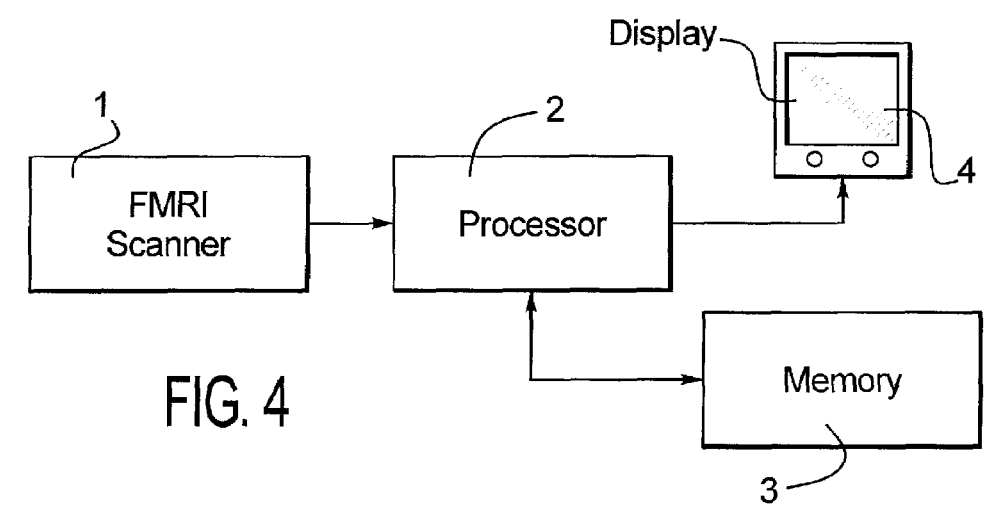
FIG. 4 schematically illustrates an MRI apparatus as an example of an apparatus for implementing the inventive method.

Accordingly, FIG. 4 shows an FMRI scanner 1, with which data sets containing FMRI data are acquired from an examination subject, a processor 2 wherein the inventive method is performed, and a memory 3 and a display 4 for, respectively, storing and displaying the calculation results from the processor 2.

Given use of a general linear model, a model matrix G (also designated as a design matrix) is defined that is composed of a number of columns with model functions. This is explained using a time series as an example that, for simplification, is merely comprised of twenty measurements. Twenty measurement values $x_m$ are thereby acquired for each volume element, with m=0 . . . max−1 and max=20. A matrix with five model functions (i.e. a matrix with five columns and twenty rows) is selected as a model matrix for this explanation.

Situated in the first column is the model function of the neuronal activation (also designated as a paradigm), which can be formed, for example, by $$G = (11111000110011001100)^T$$

A constant portion in the measurement data is represented in the second column:

$$G_{m,1} = 1$$

The further three columns serve as a high-pass filter, i.e. they model slow drifts during the measurement on a cosine basis. These model functions can be selected, for example, as:

$$G_{m,2} = \cos\left(\frac{\pi \cdot i}{\max}\right)$$

$$G_{m,3} = \cos\left(\frac{2 \cdot \pi \cdot i}{\max}\right)$$

$$G_{m,4} = \cos\left(\frac{3 \cdot \pi \cdot i}{\max}\right)$$

The model matrix $G_{m,j}$ thus contains the collection of model functions which should be adapted to the measurement data $x_m$.

The problem of orthogonal portions being lacking in these model functions is discussed in detail in connection with this explanation of the general linear model and its exemplary incremental calculation.

A least-squares estimation of the parameters is implemented in the comparison of the measurement data with these model functions. A vector b is defined from which the correlation of the measurement data series with individual model functions of the model matrix is apparent. This vector b is calculated or estimated in the following manner with a least-squares method:

$$x = G \cdot b + E \text{(with } |E|^2 = \min\text{)}$$
$$\Rightarrow (G^T \cdot G) \cdot b = G^T \cdot x$$
$$\Rightarrow b = (G^T \cdot G)^{-1} \cdot G^T \cdot x,$$

wherein x represents the vectors that contain the measurement data, b represents the vector that specifies the linear combination of the model function that best approximates the measurement data, and E represents the error vector.

In the present example, the vector b contains five values corresponding to the number of the columns or model functions of the model matrix. The respective value represents how the corresponding model function must be scaled in order to approximate the measurement data.

An error evaluation must be implemented next in order to obtain a conclusion about the quality of the estimation. The value σ is calculated for this purpose, as follows:

$$\sigma := \sqrt{\frac{E \cdot E}{\max - rang(G)}}$$

with $E = G \cdot b - x$.

Finally, what is known as the t-valve is calculated, meaning that for each volume element a value t is obtained that has a magnitude that is a measure for the degree of correlation of the measurement data series with the model function in question. In functional imaging methods (such as the functional magnetic resonance tomography explained herein as an example), it is typical to visualize these t-values. For the calculation of the t-value, a contrast must initially be defined that specifies the model function of interest. In the present case, this contrast c can be provided by the following value:

$$c = (1 0 0 0 0)^T.$$

The t-value then results in the following manner:

$$t := \frac{c \cdot b}{\sqrt{\sigma^2 \cdot c \cdot [(G^T \cdot G)^{-1} \cdot c]}}$$

In the known implementations that do not operate incrementally, the time series of each voxel is extracted from the fMRI data set and subjected to the above analysis in succession. For this purpose it is necessary to simultaneously load the total measurement data of all volume data sets into the working memory for the calculation. In addition to the high memory space requirement, this also leads to a correspondingly slow calculation speed.

Conversely, the storage space requirement can be reduced and the calculation speed can be increased with the present method. In the present method, in the updating process the fMRI data set is run through per volume, i.e. one volume data set after another, and the respective calculations are implemented in each volume data set for each volume element.

This can ensue in the following manner. In the updating process, in which all volume data sets are run through once, the vector GTx is updated for each new volume data set and each voxel, with only the new row of the model matrix and the new measurement value being accessed:

$$GTx_i = GTx_i + G_{m,i} \cdot x_m.$$

GTx designates the vector $G^T \cdot x$. This calculation is implemented in each new volume data set for each volume element and can be distributed per voxel to various computers or processors. The value obtained from the preceding volume data set is updated for the individual components of the vector GTx. This value must be set to zero given implementation of the calculation for the very first volume data set.

The implementation of this calculation for each volume data set means that a sufficient buffer for the intermediate value of GTx must be present that corresponds to the number of the volume elements in the volume data set multiplied by the number of the model functions in the model matrix.

Furthermore, the square XX of the measurement value vector is updated in this run through the data sets for each new volume data set and each voxel, with only the new measurement value being accessed:

$$XX = XX + (x_m)^2$$

At the same time, in this pass through the volume data sets for each new volume data set the matrix GTG (corresponding to $G^T \cdot G$) can also be updated using the following rule:

$$GTG_{i,k} = GTG_{i,k} + G_{m,i} \cdot G_{m,k}.$$

After obtaining the matrix GTG, this is conditioned according to the method (described further below) for masking out interfering model functions and is subsequently inverted. Since this matrix is a small, symmetrical, real matrix (in the present example a 5×5 matrix), this inversion can ensue, for example, by means of an LU decomposition, but other inversion algorithms naturally can be used. Finally, the vector b is calculated for each volume, by:

$$b = GTG^{-1} \cdot GTx.$$

After implementation of the updating process, the values for the vector b and the pseudo-inverse $(G^T \cdot G)^{-1}$ are thus established.

For calculation of the value for the square of the error vector E (designated in the following as EE), it is utilized that the part of the measurement value vector (designated as model vector M) that can be represented by the model and the vector E are situated perpendicular to one another due to the least squares condition and, when added, result in the measurement value vector X. Only the length of the measurement value vector and the length of the model vector must thus be determined in order to be able to calculate EE from this using the Pythagorean theorem.

The following apply:

$$M = G \cdot b$$

$$MM = M \cdot M$$

$$MM = (G \cdot b) \cdot (G \cdot b) q \cdot q = \sum_{i=0}^{\max-1} q_i \cdot q_i$$

With $$q_i = \sum_{j=0}^{sp-1} G_{i,j} \cdot b_j$$

Making the insertion yields $$MM = \sum_{i=0}^{max-1} \sum_{j=0}^{sp-1} G_{i,j} \cdot b_j \cdot \sum_{k=0}^{sp-1} G_{i,k} \cdot b_k$$

$$= \left[ \sum_{i=0}^{max} \left[ \sum_{j=0}^{sp-1} \sum_{i=0}^{sp-1} (G_{i,j} \cdot G_{i,j}) \cdot b_j \cdot b_k \right] \right]$$

The inner brackets represent the matrix $GTG^{-1}$ that were already calculated. Thus $$MM = MM + GTG_{j,k} \cdot b_j \cdot b_k$$

such that MM can be calculated quickly and directly leads to EE:

$$EE = XX - MM.$$

For the previously-implemented calculations, the following apply:

$i=0 \ldots sp-1$,
$k=0 \ldots sp-1$,
$j=0 \ldots sp-1$,
$m=0 \ldots max-1$, wherein max is the number of the measurements or volume data sets and sp is the number of the columns of the model matrix G.

The t-value for this comparison can now be calculated after each addition of a volume data set or also only at the end of the measurement. In the present example, a scaling factor Scale for the t-value is initially calculated for the t-value according to the following rule:

$$Scale = Scale + c_i \cdot GTG_{i,j} \cdot c_j,$$

wherein c is the contrast vector.

This calculation is implemented for each volume element. Furthermore, $\sigma^2$, which results according to the following known rule, results for each volume element:

$$\sigma^2 := \frac{EE}{max - rang(G)}$$

The t-value can be separately calculated from this value as $$t + c_i \cdot b_i$$

for each voxel. This t is ultimately divided by $\sqrt{\sigma^2 \cdot Scale}$ in order obtain the final t-value for each voxel which, for example, can be visualized by superimposition on a conventional magnetic resonance image of the subject volume. The last calculations can likewise be distributed per voxel to different computers or processors that calculate in parallel in order to accelerate the calculation.

Figure 1:
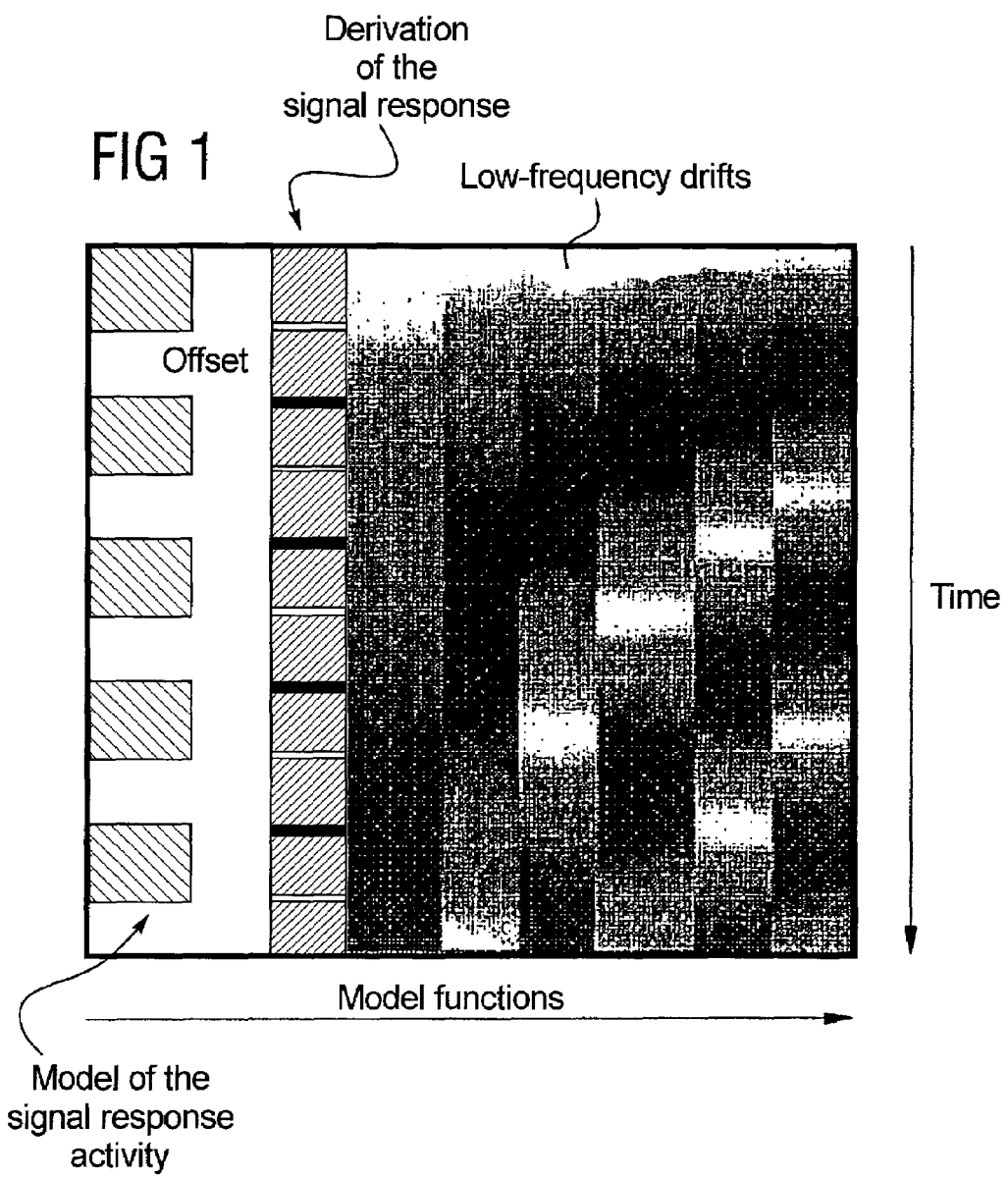
FIG. 1 is an example for a typical design matrix in graphical representation.

The preceding discussion exemplarily describes method steps in the incremental calculation of the general linear model using a time series with only twenty data sets. Normally, significantly more measurements or scans (and thus data sets) exist in the actual implementation of fMRI. In a graphical representation, FIG. 1 shows an example of a typical design matrix G for the analysis of a time series with two states that are each ten scans long. The total time series contains 100 data sets or scans. The expected signal response from a neuronally active area is modeled in the first column. The evaluation should answer the question of the extent to which these components contribute in a statistically significant manner to the description of the measurement data. Eight further columns, follow that describe further characteristics of the measurement data such as the offset (2nd column), the derivation of the signal response (3rd column) or low-frequency drifts (4th-9th columns). The low-frequency drifts are orthogonal and are situated such that the highest frequency is sufficiently lower than the lowest frequency components of the stimulation paradigm (1st column). The model functions thus form a fast, perfect orthogonal basis of the solution domain.

In the course of an fMRI scan or data acquisition, the shown design matrix is now successively assembled from the top down. In the shown example, a statistical analysis can be reasonably begun when data have been acquired from both stimulation states. If the shown model is now used after approximately 15 measurements, the used model functions strongly correlate, meaning that they still do not form an orthogonal base. All components of the low-frequency drifts in this time segment show a decline that differs only slightly in the slope. The stimulation paradigm is essentially composed of two plateaus that, in time segment, thus strongly correlates with the signal decline that is modulated in the drifts.

This correlation can be seen in FIG. 2, which as an example considers the correlation of the model functions for the low-frequency drifts 1-6 (corresponding to the 4th-9th columns of the design matrix) over the entire time series, i.e. all 100 scans or data sets. Both images of FIG. 2 show some of the correlations for this design matrix in the time curve. From both images it is clear that changing, intermittent strong correlations between the model functions are present across long time spans given an incremental calculation, even when the model functions are orthogonal, as expected at the end of the measurement series.

Correlating model functions do not meaningfully contribute to the solution of the problem. The model functions span an n-dimensional solution domain on which the measurement data are projected. If model functions correlate, the functions thus do not form a basis, or at least do not form a numerically stable, usable basis, for the solution domain. A better basis, which essentially spans the same solution domain can be achieved from the design by elimination of the model functions (designated as interfering model functions in the present discussion) causing the correlations. For this, during the calculations of the general linear model the correlation of all model functions must be checked for each adaptation of the section of the data to be analyzed. Using a suitable measure, an algorithm can decide which model functions can be reasonably used and which cannot. Furthermore, the measure can also be used in order to smoothly introduce model functions into the modeling. This is described below. The correlation coefficient can be used as the aforementioned measure. The angle between the functions (which angle can be calculated with the aid of the scalar product) can be used as an initial value for this measure. If applicable, it is also possible to identify a minimal set of interfering model functions by means of a progressive analysis, for example consideration of the variance/covariance matrix.

After the identification of the interfering model functions, in the present example an estimate is established for the portion of these functions in the calculation. This estimate or contribution is preferably set to zero. In other words, specific components can be established via suitable modification of the projector of the measurement data on the solution space. This ensues in the following manner in the present example.

In the calculations of the general linear model, in each case the contributions $b_1$ of the model functions that best describe the measurement data are estimated with a least square method. For the present masking of the interfering model functions, the equation $$(G^T \cdot G) \cdot b = G^T \cdot x$$

already discussed above is now used. If it is established in the analysis of the model functions that, for example, the model functions i and j correlate significantly, model function j, for example, is masked out from the modeling. The estimator of the contribution $b_j$ of this functions should consequently be set to zero or near zero. The above equation then can be viewed as:

$$M \cdot b = v.$$

In order to now solve this equation with minimal $b_j$, a larger value w is entered or added at the position j on the diagonals of the quadratic matrix M:

$$\left( M + \begin{pmatrix} 0 & 0 & 0 & 0 & 0 \\ 0 & \ddots & 0 & 0 & 0 \\ 0 & 0 & w & 0 & 0 \\ 0 & 0 & 0 & \ddots & 0 \\ 0 & 0 & 0 & 0 & 0 \end{pmatrix} \right) \cdot b = v$$

and thus $$\begin{pmatrix} \sum_k M_{1,k} \cdot b_k \\ \vdots \\ \sum_k M_{j,k} \cdot b_k \\ \vdots \\ \sum_k M_{m,k} \cdot b_k \end{pmatrix} = \begin{pmatrix} v_1 \\ \vdots \\ v_j - w \cdot b_j \\ \vdots \\ v_m \end{pmatrix}$$

Given a sufficiently large value for w, a very small $b_j$ results as a solution. It is sufficient when the value for w is selected some orders of magnitude higher than the largest values in the matrix M. Values for w that are too large can lead to numerical inaccuracies and are therefore not advantageous in the practical application. The proposed technique for masking of interfering model functions can be simultaneously implemented for a number of model functions, such that any component can be masked out.

Since the matrix $M = G^T \cdot G$ is continuously calculated in the incremental calculation of the general linear model, the inventive conditioning of this matrix according to necessity can occur during the run-time. FIG. 3 shows the procedure described above for determination of the masking of interfering model functions in a schematic manner.

By this conditioning of the matrix M, in the incremental calculation sufficiently orthogonal portions of all model functions contributing to the calculation are achieved for each directly considered time segment without incurring a high computation expenditure due to this additional measure. This enables the calculation and output of intermediate results in the incremental calculation of the general linear model, even in cases in which the model functions selected in the design matrix do not exhibit orthogonal portions to a sufficient degree in specific time segments of the time series.

Furthermore, it is possible to couple the value w to the measure for determination of the interfering model functions. For example, the magnitude of the correlation coefficients between the above model functions i and j or a quantity derived therefrom (such as the square of the correlation coefficients thus can be used as a factor in the value w. In the shown example, a smooth coupling and uncoupling of the respective model functions into or out of the calculation for the respective time segment can be realized. Jumps in the results that may possibly occur due to an unadapted activation and deactivation of model components thus can be avoided.

Although modifications and changes may be suggested by those skilled in the art, it is the intention of the inventors to embody within the patent warranted hereon all changes and modifications as reasonably and properly come within the scope of their contribution to the art.

We claim as our invention:

1. A computerized method for processing data comprising a plurality of data sets respectively containing a plurality of different random samples, said method comprising the steps of:

for each individual random sample contained in a data set, automatically electronically checking for occurrence of specific characteristics of a dependency of that random sample on an order quantity by comparing, in a predetermined sequence of said data sets, the dependency of that random sample on said order quantity with a dependency on said order quantity of model functions contained in a model matrix, using the general linear model, to obtain an intermediate comparison result;

before said checking of each individual random sample, automatically electronically determining whether said model functions in said model matrix exhibit, within a time segment represented by the data set containing the random sample to be checked, a degree of orthogonality sufficient to cause said model matrix to represent a determinable equation system, and masking out, to a predetermined degree, model functions that interfere with said sufficient degree of orthogonality from contributing to the comparison; and storing each intermediate comparison result as it occurs and making the stored intermediate comparison results, and a final result comprising the respective intermediate comparison results for all of said data sets, electronically available.

2. A method as claimed in claim 1 comprising masking out said model functions that interfere with said sufficient degree of orthogonality by setting the interfering model functions to have a lower degree of contribution to said comparison than model functions that do not interfere with said sufficient degree of orthogonality.

3. A method as claimed in claim 2 comprising setting said interfering model functions to have a lower predetermined degree of contribution to said comparison by augmenting a diagonal of a quadratic matrix M, generated from said comparisons, at respective positions associated with the interfering model functions, with $M = G^T \cdot G$, wherein G is said model matrix.

4. A method as claimed in claim 1 comprising masking out said interfering model functions by setting said predetermined degree of contribution as a function of a degree of orthogonal portions of said interfering model function with another model function with which the interfering model function exhibits a highest degree of parallelism.

5. A method as claimed in claim 1 wherein the step of checking said sufficient degree of orthogonality comprises automatically electronically calculating a correlation function between respective model functions.

6. A method as claimed in claim 5 comprising comparing said correlation coefficient to a predetermined value and determining that the correlated model functions have said sufficient degree of orthogonality if said correlation coefficient is below said predetermined value.

7. A method as claimed in claim 5 comprising automatically electronically employing a quantity derived from said correlation coefficient as a measure of orthogonal portions between the correlated model functions.

8. A method as claimed in claim 1 wherein the step of checking said sufficient degree of orthogonality comprises forming and analyzing a scaler product between respective model functions.

9. A method as claimed in claim 8 comprising determining that a sufficient degree of orthogonality exists between two model functions that form a scaler product when an angle between said respective model functions forming said scaler product is above a predetermined value.

10. A method as claimed in claim 9 comprising automatically electronically employing a quantity derived from said angle as a measure of orthogonal portions of the respective model functions forming the scaler product.

11. A computerized apparatus for processing data comprising a plurality of data sets respectively containing a plurality of different random samples, comprising:

a computer programmed to, for each individual random sample contained in a data set, automatically electronically checking for occurrence of specific characteristics of a dependency of that random sample on an order quantity by comparing, in a predetermined sequence of said data sets, the dependency of that random sample on said order quantity with a dependency on said order quantity of model functions contained in a model matrix, using the general linear model, to obtain an intermediate comparison result;

before said checking of each individual random sample, automatically electronically determining whether said model functions in said model matrix exhibit, within a time segment represented by the data set containing the random sample to be checked, a degree of orthogonality sufficient to cause said model matrix to represent a determinable equation system, and masking out, to a predetermined degree, model functions that interfere with said sufficient degree of orthogonality from contributing to the comparison; and a memory for storing each intermediate comparison result as it occurs and making the stored intermediate comparison results, and a final result comprising the respective intermediate comparison results for all of said data sets, electronically available.

12. An apparatus as claimed in claim 11 comprising a magnetic resonance scanner that acquires said plurality of data sets by interacting with an examination subject.

* * * * *